Figure 1:
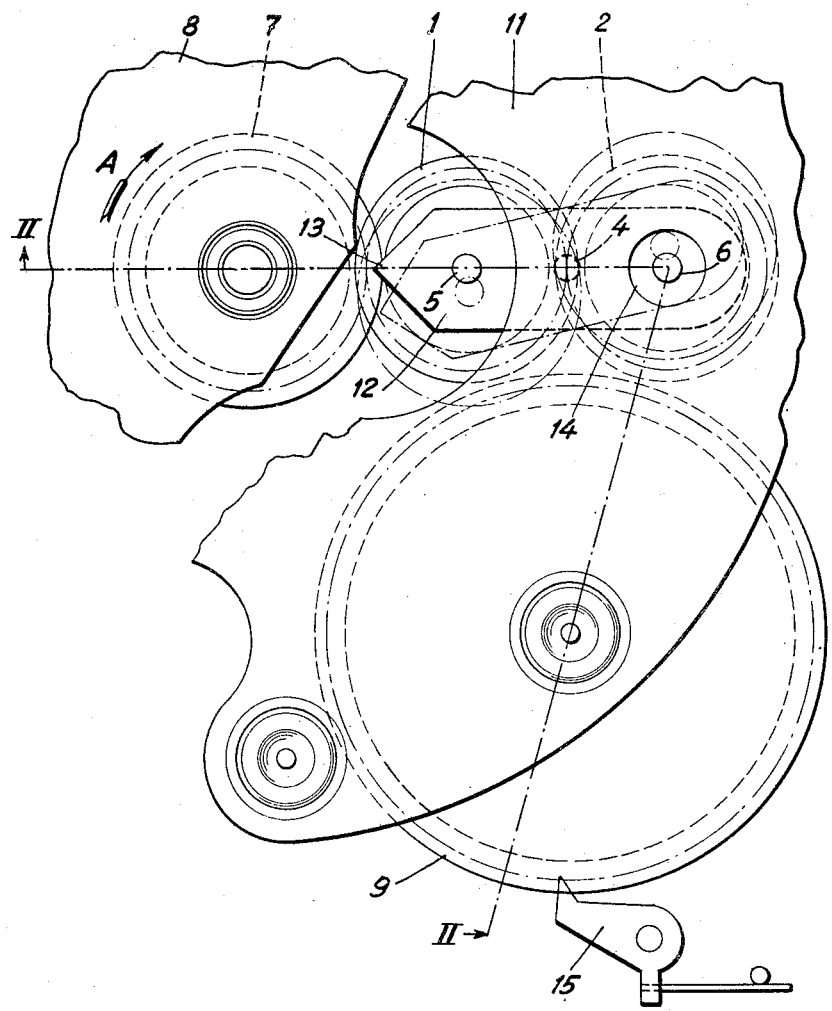

Oct. 9, 1956

A. GODAT 2,765,679

UNIDIRECTIONAL DRIVING GEAR

Filed Feb. 18, 1952

3 Sheets-Sheet 1

Inventor
Abel Godat
by Karl... atty.

Oct. 9, 1956

A. GODAT 2,765,679

UNIDIRECTIONAL DRIVING GEAR

Filed Feb. 18, 1952

3 Sheets-Sheet 2

Inventor
Abel Godat
by Karl Michaelis, Atty.

Oct. 9, 1956    A. GODAT    2,765,679
UNIDIRECTIONAL DRIVING GEAR
Filed Feb. 18, 1952    3 Sheets-Sheet 3
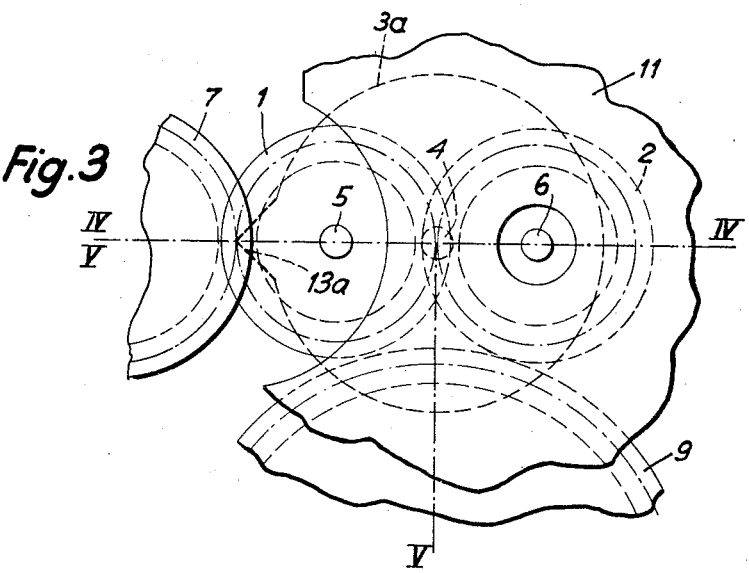
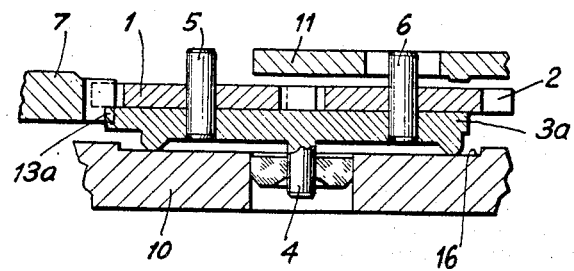
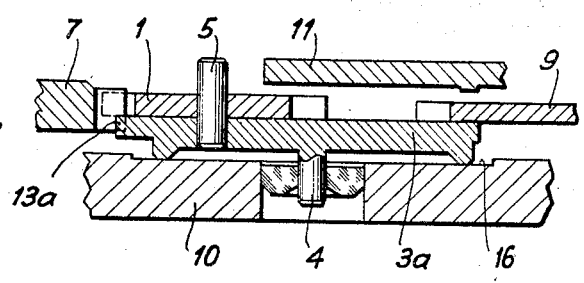
INVENTOR
Abel Godat
BY Karl Michaelis
ATTORNEY

United States Patent Office 2,765,679
Patented Oct. 9, 1956

2,765,679
UNIDIRECTIONAL DRIVING GEAR

Abel Godat, Bienne, Switzerland, assignor to Bulova Watch Company Inc., New York, Bienne Branch, Bienne, Switzerland, a joint-stock company of Swiss law Application February 18, 1952, Serial No. 272,139

Claims priority, application Switzerland February 28, 1951

2 Claims. (Cl. 74—812)

This invention relates to unidirectional driving mechanism adapted for use for instance in watches and other clockwork mechanisms. It will be described hereinafter as being applied to a self-winding watch comprising in combination with an oscillating weight a pair of intermeshing wheels pivoted on a loosely rockable yoke and in which the first of the two wheels is constantly in gear with a third wheel carried along by the oscillatory weight, while a winding wheel is arranged near the pair of wheels mentioned in the first place in such a manner that by the rocking movements of the body supporting this pair of wheels, they alternately come into operative contact with the winding wheel.

The mechanism according to the present invention is characterized thereby that the rocking movement is provoked on the one part by a click or pawl which coacts with the winding wheel, and on the other part by a carrier fixed to the yoke and ending in a tooth which lightly enters the gaps between the teeth of said third wheel, whenever the yoke occupies a neutral position, i. e. a position in which none of the wheels of the pair of wheels is in mesh with the winding wheel.

The carrier may consist of a plate supported on the pivots of the pair of wheels, but it may also be integral with the yoke.

In the drawings affixed to this specification and forming part thereof two embodiments of this invention are illustrated diagrammatically by way of example.

Figure 2:
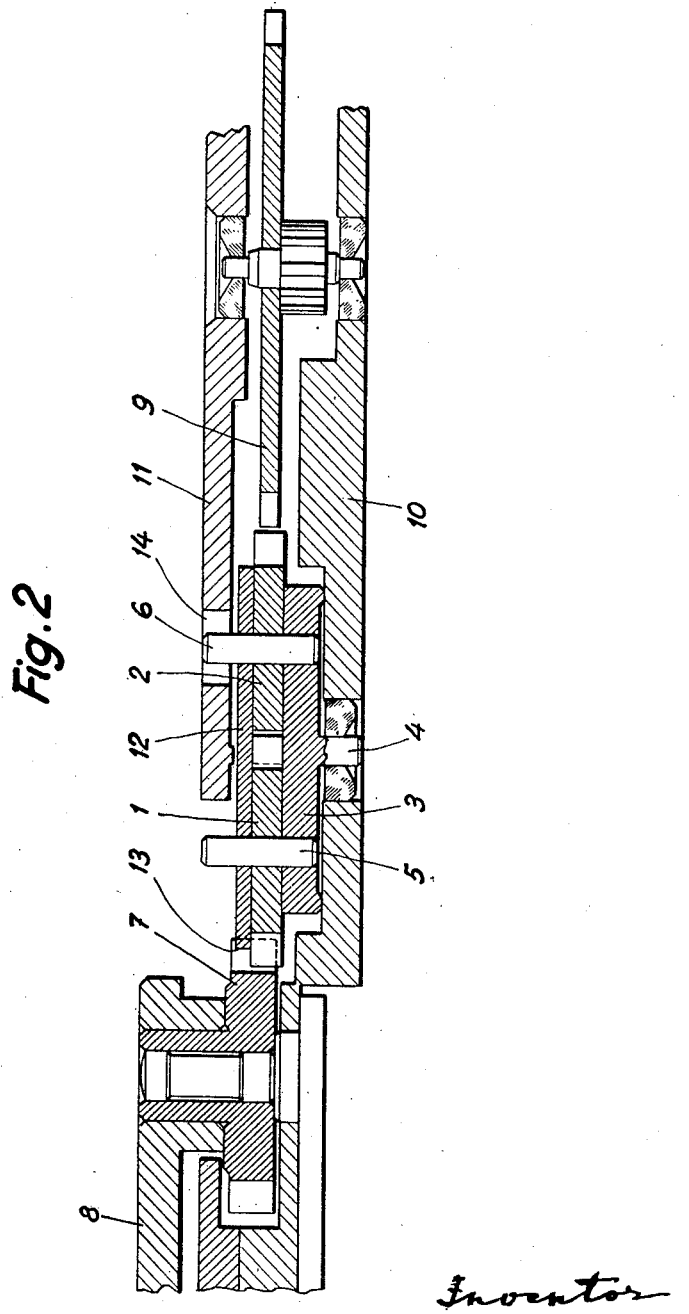

In the drawing:

Fig. 1 is a plan view of the first embodiment.
Fig. 2 is a section along the line II—II in Fig. 1.
Fig. 3 is a plan view of the second embodiment showing only those parts of the mechanism represented in Fig. 1, which differ therefrom.
Fig. 4 is a section along the line IV—IV in Fig. 3, and
Fig. 5 is a section along the line V—V in Fig. 3.

In the drawing only those parts are shown which are necessary for the comprehension of the nature of this invention.

Referring to the drawing, 1 and 2 are two wheels of similar diameter which are in mesh with each other and are pivoted on a yoke 3 carrying a pivot 4, disposed at equal distance from the axles 5 and 6 of the two wheels 1 and 2, and by means of which the yoke is freely mounted rotatably on the bridge 10. The wheels 1 and 2 extend in the same plane and the axle 4 of the yoke 3 is parallel to the axles 5 and 6.

The wheel 1 is constantly in mesh with a wheel 7 driven by the oscillating weight 8. A winding wheel 9 is arranged near the pair of wheels 1 and 2 in such manner that by the rocking movement of the element 3 which supports them, they come into mesh alternately with the winding wheel 9.

At 10 the automatic frame-work and at 11 the bridge for the automatic device are shown, the frame-work 10 carrying the yoke 3 while the winding wheel 9 is pivoted in the frame-work 10 and the bridge 11.

The carrier consists of a plate 12 formed with two perforations through which extend the axles 5 and 6 of the wheels 1 and 2. The plate 12 rests on the wheels 1 and 2 and is axially held in place by the automatic bridge 11. The plate 12 ends in a tooth 13 which loosely penetrates into a gap between two teeth of the wheel 7 when the yoke occupies a neutral position, i. e. a position in which none of the two wheels 1 and 2 is in engagement with the winding wheel 9. Fig. 1 shows such a neutral position in full lines, while dot-and-dash lines show the position in which the wheel 1 is in engagement with the wheel 9.

Assuming that the oscillating weight 8 starts turning from the position shown in Fig. 1 in clockwise direction indicated by the arrow A, the carrier 12 whose tooth is acted upon by the wheel 7, turns the yoke 3 about its axis 4 in counter-clockwise direction and thereby brings the wheel 1 into engagement with the winding wheel 9. The movement of the yoke 3 is limited by the fact that the axle 6 of the wheel 2 extends into an aperture 14 provided in the bridge 11 so that a correct depth of engagement of the wheel 1 in the wheel 9 is obtained, at which exists the minimal relative spacing of the axes of the two wheels. If these axes were to further approach each other, the teeth of the two wheels would deeply penetrate each other and would become blocked, which must of course be avoided. If the yoke 3 occupies the correct position, the tooth 13 of the carrier 12 is out of reach of the teeth of the wheel 7. The yoke 3 is maintained in the correct extreme position by the engagement of the teeth of the wheel 1 with those of the wheel 9.

When the oscillating weight 8 starts turning in the counter-clockwise direction, while the parts occupy the position shown in dot-and-dash lines, the wheel 1 owing to the pawl 15 cannot turn the wheel 9 in counter-clockwise direction and the teeeth of the wheel 9 force the yoke 3 into a neutral position. The tooth 13 of the carrier then engages the teeth of the wheel 7 and the yoke 3 is thus carried along into its other extreme position in which the wheel 2 is in mesh with the winding wheel.

The carrier might be integral with the yoke 3, as the second embodiment shows in Figs. 3, 4 and 5. In this case there are provided also a wheel 7 actuated by the oscillating weight, two wheels 1 and 2 pivoted on a yoke 3a, and a winding wheel 9, the axes of which are arranged in the same way as in the first embodiment.

Instead of a yoke 3 and a carrier 12 with a tooth 13, there is only a yoke 3a which is located within a shallow recess 16 provided in the upper surface of bridge 10, so that the yoke 3a lies substantially on the same level as wheel 7.

This yoke is provided at its periphery with a tooth 13a which is made integral with the yoke. This tooth operates like that of the carrier 12 of the first embodiment, so that the carrier may be dispensed with here. In this second embodiment, bridge 11 also holds the wheels 1 and 2 axially in place.

I wish it to be understood that I do not desire to be limited to the details shown in the drawing and described in the foregoing specification for obvious modifications will occur to a person skilled in the art.

I claim:

1. Unidirectional driving gear comprising in combination a driving wheel, a loosely rockable yoke, a pair of wheels in engagement with each other mounted for rotation on said yoke, one wheel of said pair of wheels permanently meshing with said driving wheel, a driven wheel mounted so near to said pair of wheels that the wheels of said pair are carried alternately by the rocking movements of said yoke into engagement with said driven wheel, a pawl arranged for coaction with said driven wheel and a carrier operatively carried by said yoke and formed at its end with a tooth extending loosely into a gap between the teeth of said driving wheel when said yoke occupies a position in which none of the two wheels of said pair of wheels is in engagement with said driven wheel, cooperating in causing rocking movement of said yoke.

2. The mechanism of claim 1, in which the carrier is a plate mounted on the pivots of the pair of wheels.

References Cited in the file of this patent

UNITED STATES PATENTS

| | | |
|---|---|---|
| 1,710,631 | Loram | Apr. 23, 1929 |
| 2,428,828 | Berge | Oct. 14, 1947 |

FOREIGN PATENTS

| | | |
|---|---|---|
| 233,899 | Switzerland | Nov. 16, 1944 |